Figure 1:
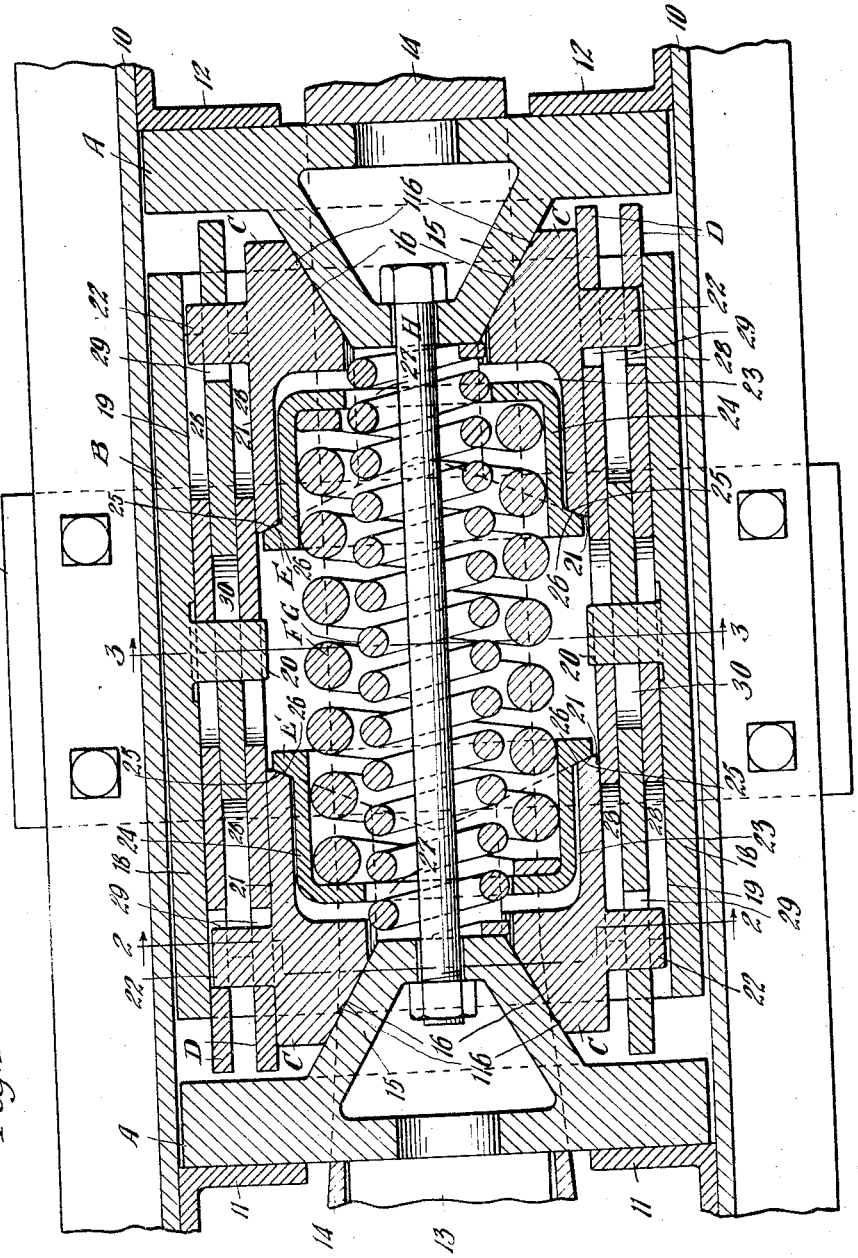

May 8, 1928.

S. B. HASELTINE 1,668,902

FRICTION SHOCK ABSORBING MECHANISM

Original Filed July 21, 1924  2 Sheets-Sheet 1

Witnesses

Wm. Geiger

Inventor
Stacy B Haseltine
By George D Haight
His Atty.

May 8, 1928.
S. B. HASELTINE
1,668,902
FRICTION SHOCK ABSORBING MECHANISM
Original Filed July 21, 1924  2 Sheets-Sheet 2
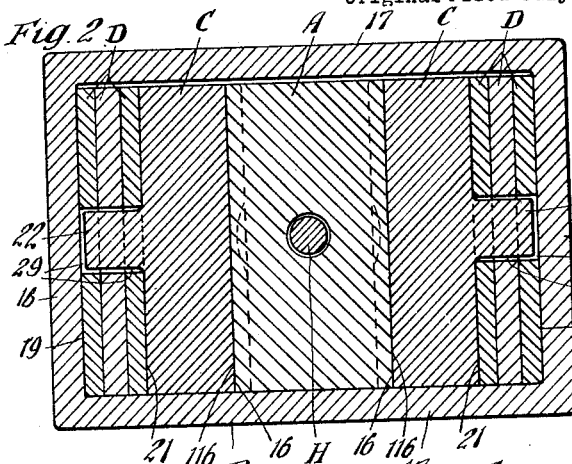
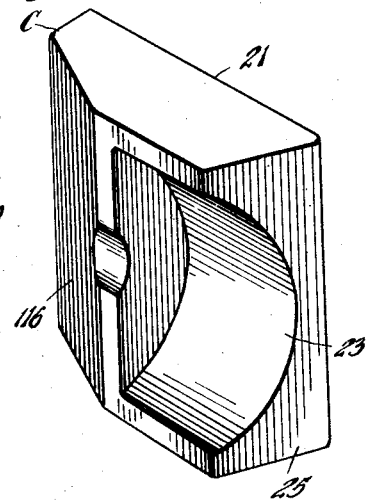
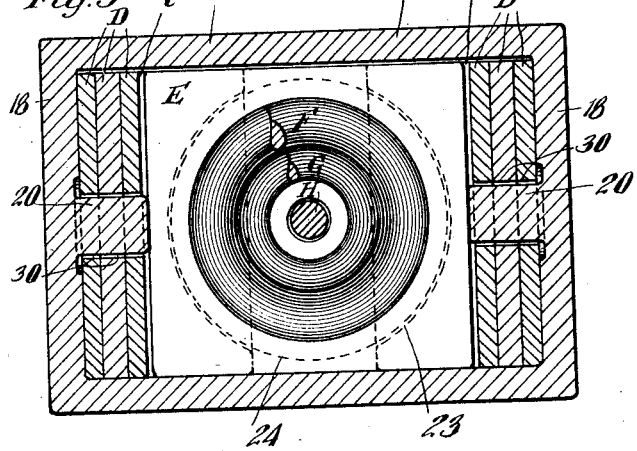
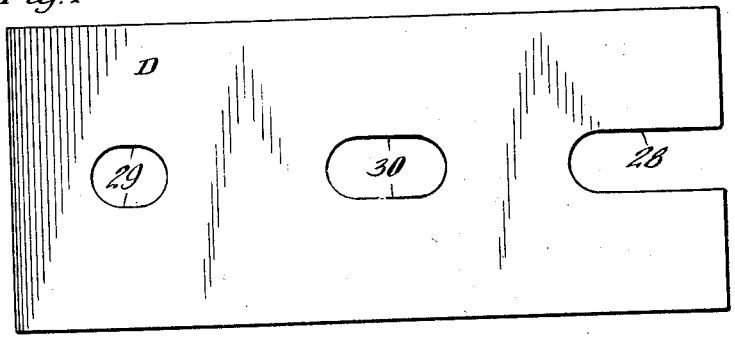
Witnesses
Wm. Geiger
Inventor
Stacy B. Haseltine
By George I. Haight
His Atty.

Patented May 8, 1928.

1,668,902

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 21, 1924, Serial No. 727,140. Renewed December 29, 1926.

This invention relates to improvements in friction shock absorbing mechanisms.

One object of the invention is to provide a friction shock absorbing mechanism, more particularly adapted for railway draft riggings, wherein is obtained high capacity due to large frictional areas, together with a preliminary action during compression and easy release.

Another object of the invention is to provide a friction shock absorbing mechanism of the intercalated plate type, including a friction shell and wedge spreading means comprising wedge pressure transmitting elements, wherein the wedge pressure transmitting elements are released independently of the friction shoes and other elements of the mechanism, thereby preventing sticking of the parts.

Other objects and advantages of the invention will more clearly and fully appear from the description and claims hereinafter following.

In the drawings forming a part of this specification, Figure 1 is a horizontal, longitudinal, sectional view of a railway draft rigging illustrating my improvements in connection therewith. Figures 2 and 3 are transverse, vertical sectional views of the shock absorbing mechanism proper, corresponding respectively to the lines 2—2 and 3—3 of Figure 1. Figure 4 is a detail side elevational view of one of the friction plates used in connection with my improved mechanism. And Figure 5 is a detail, perspective view of one of the friction wedge shoes.

In said drawings, 10—10 indicate channel-shaped center or draft sills of a railway car underframe, to the inner faces of which are secured front stop lugs 11—11 and rear stop lugs 12—12. The inner end portion of the draw-bar is shown at 13, to which is suitably secured a hooded yoke 14 of the usual construction. The shock absorbing mechanism proper, including the front and rear followers, is disposed within the yoke 14 and the movable parts of the draft rigging are supported by a detachable saddle plate 15.

The friction shock absorbing mechanism proper, comprises broadly, front and rear followers A—A; a friction casing or shell B; front and rear pairs of friction wedge shoes C—C; two groups of friction plates D—D; front and rear spring follower caps E—E; a main spring resistance F; an auxiliary spring resistance G and a retainer bolt H.

The front and rear followers A are of like construction, each being in the form of a heavy, rectangular plate, and preferably having the wedge member 15 formed integral therewith, the latter being in the form of a hollow enlargement on the inner side of the follower. Each member 15 has a pair of faces 16 at opposite sides thereof, converging inwardly of the mechanism and adapted to cooperate with a corresponding pair of friction shoes.

The friction casing or shell B is of rectangular hollow box-like form, open at its front and rear ends, and has spaced, longitudinally disposed, top and bottom walls 17, and longitudinally extending, spaced side walls 18. The side walls present interior, longitudinally disposed, friction surfaces 19 with which the friction plates cooperate. Each side wall has a centering lug 20 on the inner side thereof, the lug 20 being preferably formed integral therewith and disposed midway between the front and rear ends of the shell and equally spaced from the top and bottom thereof. In the normal position of the parts, the shell B has its front and rear ends equally spaced from the corresponding followers and the movement of the followers toward each other is limited by engagement with the ends of the shell.

The friction wedge shoes C are four in number, arranged in pairs at opposite ends of the mechanism, each pair cooperating with the corresponding wedge member 15, each shoe D on the side thereof nearest the axis of the mechanism being provided with an outer wedge face 116 adapted to cooperate with one of the wedge faces 16 of the corresponding wedge member 15. At the opposite side, each shoe D has an elongated friction surface 21 adapted to engage the innermost friction plate of the corresponding group D. Each shoe is also provided with an integral, laterally projecting plate restoring lug 22, disposed inwardly of the outer end of the shoe and equally spaced from the top and bottom thereof. As clearly shown in Figures 1 and 5, each shoe is cut away at its inner side to provide a concavity 23 rearwardly of the face 116, adapted to accommodate the side of the cup-shaped section 24 of the corresponding follower cap E. The rear end of each shoe is preferably provided with a beveled face 25 adapted to cooperate with a correspondingly beveled surface 26 at the base of the corresponding cup-like spring follower cap E. As clearly shown in Figure 1, each cap E is provided with a pair of beveled surfaces 26 at the opposite sides of the center thereof, said surfaces converging outwardly of the mechanism and adapted to cooperate with the corresponding shoes to hold the inner ends of the latter in engagement with the groups of friction plates.

The spring resistance F, which is in the form of a relatively heavy coil, is interposed between the spring followers E and has its opposite ends seated in the cup-shaped sections thereof and bearing on the end walls of said sections. The spring resistance G, which is relatively light, is disposed centrally within the spring F and is interposed between the wedge members 15, having its opposite ends bearing on the inner ends of said members, the end walls of the cup-shaped sections of the front and rear spring followers being provided with alined openings 27 through which the spring G extends and said openings being of such a size as to freely accommodate the spring.

The friction plates D are longitudinally arranged within the shell and comprise two oppositely disposed groups. As herein shown, each group comprises three plates. The plates D are all of idential design, each plate being provided with an inwardly extending slot 28 at one end, and an elongated opening 29 adjacent the opposite end, and a second elongated opening 30 between the ends, the latter being of greater length than the opening 29. The slot 28 and the openings 29 and 30 are disposed in longitudinal alinement and are equally spaced from the top and bottom edges of the plate. Adjacent plates of each group are reversely arranged, end for end, the inner and outer plates of each group having the ends provided with the opening 29 disposed at the one end of the mechanism, and the intermediate plate of each group having the end provided with the opening 29 disposed at the opposite end of the mechanism. The two groups are also reversely arranged with reference to each other, the inner and outer plates of the group at one side of the mechanism and the intermediate plate of the group at the opposite side of the mechanism having the ends provided with the openings 29 disposed at the same end of the mechanism. The plate restoring lug 22 of one of the front shoes C engages with the openings 29 of the inner and outer plates of one group, and the restoring lug 22 of the rear shoe C on the corresponding side of the mechanism engages within the opening 29 of the intermediate plate of the same group, while the restoring lug 22 of the front shoe at the opposite side of the mechanism engages the opening 29 of the intermediate plate of the other group and the lug 22 of the rear shoe on the corresponding side engages within the openings 29 of the inner and outer plates of the last named group. As clearly shown in Figure 1, the openings 29 are of such a length as to permit movement of the lug therein longitudinally of the mechanism, thereby permitting limited relative movement of the shoes and the plates. In this manner, each plate is anchored at one end to one of the shoes and the slot 28 of said plate is adapted to receive and provide clearance for the lug 22 of the corresponding shoe at the opposite end of the mechanism, the slot 28 being of such a length as to permit full movement of the plate during the compression stroke. Each shell restoring lug 20 extends through the openings 30 of all the plates of one group, as clearly shown in Figures 1 and 3. The openings 30 are of such a length as to permit the full movement of the plates with reference to the shell during the compression of the mechanism and the openings 30 of the respective plates are so disposed with reference to the opposite ends of said plates and are so proportioned that the walls at the front end of the openings 30 of the plates anchored to the rear shoes will engage the front sides of the lugs 20 and the walls at the rear ends of the openings 30 of the plates anchored to the front shoes will engage the rear sides of said lugs, when the plates are in normal position. It will be evident that the plates through their connection with the lugs 20 act to properly center the shell between the front and rear followers when the plates are restored to normal position. It is also pointed out that the reverse arrangement of the two groups of friction plates also aids in the return of the shell to normal position, due to the outermost plates of the two groups moving in reverse directions during the restoration of the plates to normal position. As clearly illustrated in Figure 1, in which the parts are shown in normal position, the front ends of the outer and inner plates of one group and the front end of the intermediate plate of the other group project beyond the front end of the shell and are slightly spaced from the front follower, and the rear end of the intermediate plate of the first named group and the rear ends of the inner and outer plates of the second named group project beyond the rear end of the shell and are also slightly spaced from the rear follower.

The mechanism is held in assembled relation and under initial compression by the retainer bolt H anchored to the enlargements 15 of the front and rear followers A and extending through the coil of the spring G. In addition, the retainer bolt also serves as a means for adjusting the gear to correct overall length.

The operation of my improved shock absorbing mechanism is as follows, assuming an inward or buffing movement of the drawbar. The front follower A will be moved therewith, forcing the front wedge 15 and the shoes C rearwardly, compressing the spring resistance elements F and G and thereby forcing the rear pair of shoes C more closely into wedging engagement with the rear wedge 15, the simultaneous wedging action thus set up between the front and rear wedges and the shoes C placing the friction plates under lateral pressure. As the rearward movement of the front follower A continues, the front shoes C will tend to move the friction plates and the shell B therewith, due to the friction between the front shoes C and the innermost plates of each group between the plates of each group, and between the groups of plates and the shell B. At the same time, there will be an equal resistance to the rearward movement of the plates and the shell B due to the friction between the rear shoes C, the plates of each group and the shell B. Due to this balancing action, the rear end of the shell B and the rear ends of the plates will approach the rear follower A at substantially the same rate as the front follower approaches the front end of the shell B and the front ends of the plates, while the front shoes slip on the innermost plates and the latter in turn slip on the rear shoes C. As will be evident, during the relative movement of the shoes and the friction plates, the lugs 22 will be moved out of engagement and away from the outer end walls of the openings 29 of the plates. This action will continue until the front follower engages the front ends of the projecting friction plates and the rear ends of the remaining plates of the two groups engage the rear follower A, whereupon the plates will be moved relatively to each other, thereby increasing the frictional resistance offered. Due to the reverse arrangement of the two groups of plates, the friction shell B will be approached by the front follower and approach the rear follower at substantially the same rate. The movement of the followers, plates and shell, just described, continues until the front and rear ends of the shell B abut the front and rear followers A, whereupon the force is transmitted directly through the shell to the rear stop lugs. It will be evident that during the relative movement of the plates, the end walls of the openings 30 will be moved out of engagement with the centering lugs 20 of the friction shell. During draft, the action is the reverse of that just described, the rear follower being moved forward while the front follower is held stationary.

Upon removal of the actuating force, the initial releasing action will be an outward movement of the wedge members 15, which are separated independently of the other parts of the mechanism, being directly actuated by the spring resistance G, and the angle included between the wedging faces 16 being relatively blunt. The friction wedge shoes also will be partially released prior to any movement of the friction plates, due to the lugs 22 of the shoes being spaced from the outer end walls of the recesses 29 of said plates, during the compression stroke of the mechanism.

This initial release movement insures a reduction of the wedging pressure during the initial action, thereby reducing the pressure on the groups of plates and facilitating the restoration of the plates to normal position. As the front and rear pairs of shoes are separated, due to the expansion of the spring resistance F, the lugs of said shoes will be brought into engagement with the outer end walls of the recesses 29 of the plates for picking up the plates and returning them to normal position, as shown in Figure 1, at the same time bringing the end walls of the openings 30 into abutment with the lugs 20 and centering the shell B. It will be evident that the lugs 20 not only function as a centering means, but also limit the relative movement of the plates and act to retain them within the casing.

As wear occurs on the various friction and wedge surfaces, compensation therefor is had by the shoes C being pushed outwardly by the expansion of the spring resistance F, which as hereinbefore described, is under initial compression.

From the preceding description taken in connection with the drawings, it will be evident that on account of the direct action of the auxiliary spring in assisting release of the wedge members, sticking of the parts is prevented and a releasing action assured, immediately upon the reduction of the compression force.

It will also be evident that a very simple and efficient means is provided for restoring the parts of the mechanism to normal position, in that both the friction shell and the wedge friction shoes are formed with integral lugs which directly coact with the friction plates.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with front and rear followers; of a movable, friction shell interposed between said followers; a plurality of relatively movable friction plates within the shell; wedge pressure creating means for placing said plates under lateral pressure, said means including a plurality of friction shoes; spring resistance means cooperating with said wedge pressure creating means; means on said shoes directly engaging said plates for restoring the latter to normal position; and means on the shell directly engaged by said plates for centering the same after each compression stroke of the mechanism.

2. In a friction shock absorbing mechanism; the combination with front and rear followers relatively movable toward each other; of a movable friction casing interposed between said followers, said casing having longitudinally disposed, interior friction surfaces; a plurality of relatively movable, intercalated, friction plates within the casing cooperating with said friction surfaces; wedge pressure creating means for placing said plates under lateral pressure, said means including friction shoes; a spring resistance cooperating with said means; lugs on said shoes engaging said friction plates for restoring the latter to normal position; and centering lugs on the casing adapted to be engaged by said plates for restoring the casing to normal position.

3. In a friction shock absorbing mechanism, the combination with follower acting means; of a lateral pressure resisting member having a longitudinally disposed friction surface; a group of intercalated relatively movable friction plates cooperating with the friction surface of said member; pressure creating means for placing said plates under lateral pressure, said means including friction shoes; a spring resistance means cooperating with said pressure creating means; means rigid with said shoes and directly engaging said plates for restoring the latter to normal position; and means rigid with the lateral pressure resisting member adapted to directly engage said plates for restoring the former to normal position.

4. In a friction shock absorbing mechanism, the combination with front and rear followers, relatively movable toward and away from each other; of a movable friction casing interposed between said followers, said casing having interior, longitudinally disposed, friction surfaces; a plurality of relatively movable, intercalated friction plates disposed within said casing, said plates being divided into two groups on opposite sides of the mechanism and cooperating respectively with the friction surfaces of the casing; spreading means at opposite ends of said mechanism, said spreading means being interposed between the groups of plates, each spreading means including a wedge member and a cooperating pair of friction wedge shoes; a main spring resistance interposed between the friction shoes at the front and rear ends of the mechanism; an additional spring resistance interposed between the wedge members at the opposite ends of said mechanism; means for directly anchoring the friction plates to said shoes; and means disposed between the ends of the casing directly engaging the friction plates for centering the casing after each compression stroke.

5. In a friction shock absorbing mechanism, the combination with front and rear followers, relatively movable toward and away from each other; of a movable friction casing interposed between said followers, said casing having interior, longitudinally disposed friction surfaces; a plurality of relatively movable, intercalated, friction plates disposed within said casing, said plates being divided into two groups at opposite sides of the mechanism and cooperating respectively with the friction surfaces of the casing; spreading means at opposite ends of said mechanism, said spreading means being interposed between the groups of plates, each spreading means including a wedge member and a cooperating pair of friction wedge shoes; spring resistance means coacting with said spreading means at the opposite ends of the mechanism; means for directly anchoring the friction plates to said shoes; and means disposed between the ends of the casing directly engaging the friction plates for centering the casing after each compression stroke.

6. In a friction shock absorbing mechanism, the combination with front and rear followers, relatively movable toward and away from each other; of a movable friction casing interposed between the said followers, said casing having longitudinally disposed, interior friction surfaces; of a plurality of relatively movable, intercalated, friction plates disposed within said casing, said plates being divided into two groups at opposite sides of the mechanism and cooperating respectively with the friction surfaces of the casing; wedge members at opposite ends of the mechanism; a pair of friction wedge shoes cooperating with each wedge member, said shoes having beveled rear ends; a main spring resistance; spring followers interposed between said main spring resistance and the shoes at the opposite ends of the mechanism; said spring followers each having oppositely inclined faces respectively engaging the beveled faces of the corresponding pair of friction shoes; an additional spring resistance interposed between the wedge members at the opposite ends of the mechanism; means on the shoes directly engaging the plates for restoring the same to normal position; and means disposed between the ends of the casing directly cooperating with the friction plates for centering the casing after each compression stroke.

In witness that I claim the foregoing I have hereunto subscribed my name this 9th day of July 1924.

STACY B. HASELTINE.